(12) United States Patent
Nguyen et al.

(10) Patent No.: US 12,704,681 B2
(45) Date of Patent: Aug. 11, 2026

(54) PHOTONIC WIREBOND LOOPBACK EVANESCENT COUPLER

(71) Applicant: BAE SYSTEMS Information and Electronic Systems Integration Inc., Nashua, NH (US)

(72) Inventors: Thien An Nguyen, Austin, TX (US); Zakary N. Burkley, Amherst, NH (US); Mackenzie A. Van Camp, Lowell, MA (US); Charles J. Turner, Hollis, NH (US); John Jost, Chardonne (CH); Leif Johansson, Santa Barbara, CA (US); Gordon B. Morrison, Summerland, CA (US); Victoria M. Rosborough, Santa Barbara, CA (US)

(73) Assignee: BAE Systems Information and Electronic Systems Integration Inc, Nashua, NH (US)

( * ) Notice: Subject to any disclaimer, the term of this patent is extended or adjusted under 35 U.S.C. 154(b) by 197 days.

(21) Appl. No.: 18/426,946

(22) Filed: Jan. 30, 2024

(65) Prior Publication Data

US 2025/0244535 A1 Jul. 31, 2025

(51) Int. Cl.
*G02B 6/293* (2006.01)
*G02B 6/10* (2006.01)
*G02B 6/138* (2006.01)

(52) U.S. Cl.
CPC ......... *G02B 6/29338* (2013.01); *G02B 6/107* (2013.01); *G02B 6/138* (2013.01)

(58) Field of Classification Search
CPC ............ G02B 6/29335; G02B 6/29338; G02B 6/29341; G02B 6/107; G02B 6/138
USPC ...................................................... 385/28, 32
See application file for complete search history.

(56) References Cited

U.S. PATENT DOCUMENTS 5,128,623 A 7/1992 Gilmore
6,907,148 B2 * 6/2005 Gerdt .................. A61B 5/0816 385/32
6,930,627 B1 8/2005 Hopkins
7,085,452 B1 8/2006 Lin et al.
(Continued)

FOREIGN PATENT DOCUMENTS

CN 114488049 A 5/2022
CN 113824488 B 7/2022
(Continued)

OTHER PUBLICATIONS

Nikolay G. Pavlov et al. Ultra-compact and ultra high-Q photonic chip based optical reference cavity at 1550nm, Laser Congress 2021.

(Continued)

*Primary Examiner* — Robert Tavlykaev
(74) *Attorney, Agent, or Firm* — Scott Asmus; Gary McFaline

(57) ABSTRACT

Photonic coupling mechanisms are described. In one example, an evanescent coupler includes a substrate, first and second optical waveguides formed on the substrate, and a photonic wirebond having first and second end regions coupled to the first and second optical waveguides, respectively and a loopback portion extending between the first and second end regions, the photonic wirebond extending away from the first optical waveguide by an extension length.

18 Claims, 9 Drawing Sheets

(56) References Cited

U.S. PATENT DOCUMENTS 7,283,707 B1 10/2007 Maleki et al.
7,440,651 B1 * 10/2008 Savchenkov ............. H01P 7/10 385/32
7,532,790 B2 5/2009 Smith et al.
7,599,676 B2 10/2009 Maxim
7,599,977 B2 10/2009 Ammar
7,773,968 B2 8/2010 Maxim et al.
7,796,971 B2 9/2010 Li et al.
7,903,906 B2 3/2011 Smith et al.
7,991,025 B2 8/2011 Maleki et al.
8,115,519 B2 2/2012 Turner
8,159,736 B2 4/2012 Maleki et al.
8,285,091 B2 10/2012 Bravo-Abad et al.
8,417,076 B2 4/2013 Maleki et al.
8,699,985 B1 4/2014 Mar
8,755,653 B2 * 6/2014 DiGiovanni ....... G02B 6/02052 385/39
9,088,298 B2 7/2015 Wloczysiak
9,246,302 B2 1/2016 Wilkinson et al.
9,268,086 B2 * 2/2016 Witzens ............. G02B 6/29338
9,348,194 B2 5/2016 Herr et al.
9,435,961 B2 9/2016 Jiang
9,453,969 B2 9/2016 Kobyakov et al.
9,529,154 B2 12/2016 Van Steenberge et al.
9,804,331 B2 * 10/2017 Agarwal ............ G02B 6/29341
9,906,236 B2 2/2018 Lye et al.
9,933,566 B2 4/2018 Patel et al.
10,148,275 B1 12/2018 Pi
10,270,529 B2 4/2019 Karpov et al.
10,326,468 B2 6/2019 Lye et al.
10,461,764 B1 10/2019 Paro Filho et al.
10,509,165 B2 12/2019 Celo et al.
10,663,572 B2 5/2020 Mehdizad Taleie et al.
10,958,279 B1 3/2021 Bhatta et al.
10,996,401 B2 5/2021 Mentovich et al.
11,016,363 B2 5/2021 Lin et al.
11,079,542 B2 8/2021 Fertig et al.
11,092,748 B2 8/2021 Wang et al.
11,143,966 B2 * 10/2021 Koos ................... G03F 7/70383
11,303,287 B1 4/2022 Turner et al.
11,513,419 B2 11/2022 Kippenberg et al.
11,600,968 B2 3/2023 Cheng et al.
11,658,461 B1 5/2023 Liu et al.
12,197,002 B2 * 1/2025 Han ........................ G02F 1/212
2003/0053735 A1 * 3/2003 Vernooy ............ G02B 6/02052 385/12
2005/0025409 A1 2/2005 Welch et al.
2006/0176965 A1 8/2006 Furman et al.
2008/0001062 A1 * 1/2008 Gunn ................. G02B 6/12007 250/206
2008/0180579 A1 7/2008 Maxim
2008/0181340 A1 7/2008 Maxim
2008/0285606 A1 11/2008 Kippenberg et al.
2009/0142018 A1 6/2009 Gomyo et al.
2010/0309039 A1 12/2010 Rivers et al.
2011/0043710 A1 2/2011 Samarasooriya et al.
2014/0211890 A1 7/2014 Adnani et al.
2016/0013866 A1 1/2016 Doerr
2018/0076835 A1 3/2018 Ray et al.
2020/0313389 A1 10/2020 Bilenko et al.
2021/0072459 A1 3/2021 Kippenberg et al.
2022/0100047 A1 3/2022 Gowda et al.
2022/0131506 A1 4/2022 Venkitasubramani et al.
2022/0200576 A1 6/2022 Zhan et al.
2022/0209805 A1 6/2022 Yu et al.
2022/0407524 A1 12/2022 Srinivas et al.
2023/0130434 A1 4/2023 Mokhtari-Koushyar et al.
2023/0186005 A1 6/2023 Vermeulen et al.
2024/0280622 A1 8/2024 Burkley et al.
2024/0310590 A1 * 9/2024 Morrison ................ H01S 5/026
2025/0141183 A1 5/2025 Lacroix et al.
2025/0244635 A1 7/2025 Burkley et al.
2025/0246871 A1 7/2025 Burkley et al.

FOREIGN PATENT DOCUMENTS

EP 3 982 192 A1 4/2022
EP 3997791 A1 5/2022
WO 0225807 3/2002
WO 2005/092050 A2 10/2005
WO 2016/062998 A1 4/2016
WO 2016/066998 A1 5/2016
WO WO2016205330 A1 12/2016
WO 2018/002675 A1 1/2018
WO 2020/210461 A1 10/2020
WO 2021/257561 A1 12/2021
WO 2022/125798 A1 6/2022
WO WO2022197507 A1 9/2022
WO 2022/266760 A1 12/2022
WO 2023/016962 A1 2/2023
WO 2023/113939 A1 6/2023
WO 2023/184014 A1 10/2023
WO WO2024205573 A1 10/2024

OTHER PUBLICATIONS

M. Anderson et al. Highly efficient coupling of crystalline microresonators to integrated photonic waveguides, Optics Letters, May 1, 2018, vol. 43, No. 9.

Lefeng Zhou et al., Computer-controlled microresonator soliton comb system automating soliton generation and expanding excursion bandwidth, Optics Continuum, Feb. 15, 2022, vol. 1, No. 2.

Vanguard Automation, Photonic Wire Bonding, https://www.vanguard-automation.com/photonic-wire-bonding-2/ retrieved Jan. 25, 2024.

Kobayashi, et al., "200-KHz Swept Light Source Using a KTN Deflector and a High-speed Optical Coherence Tomography System," NTT Technical Review, vol. 12 No. 4 (Apr. 2014). 5 pages.

"200kHz Swept Light Source", NTT Advanced Technology Corporation, 2 pages.

"Agile Laser", retrieved from the Internet at: https://www.qvideaslab.ca/research-home/agile-laser/ on Jun. 25, 2024. 7 pages.

"FP4209 Insta Tune-Fast Random-Access Tunable Laser", (Product Brief), Freedom Photonics. 2 pages.

Advanced Dynamic Signal Analysis, pp. 1-34, CRYSTAL Instruments. Web. Jul. 20, 2016; [retrieved Jul. 31, 2023]. Retrieved from the Internet: <URL: http://www.crystalinstruments.com/dynamic-signal-analysis-advanced/>.

Chen, et al., "High finesse bow-tie Cavity for strong atom-photon coupling in rydberg arrays," Optics Express, vol. 30, No. 21, (Oct. 10, 2022,) 10 pages.

Kudelin, et al., " Photonic chip-based low-noise microwave oscillator," Nature, https://www.nature.com/articles/s41586-024-07058-z (Mar. 6, 2024). 13 pages.

Li, et al., "Enhanced Microwave Electric Field Measurement With Cavity-Assisted Rydberg Electromagnetically Induced Transparency," Frontiers in Physics, vol. 10, Article 846687 (Feb. 24, 2022). 6 pages.

Prajapati, et al., "Sensitivity Comparison of Two-Photon vs Three-Photon Rydberg Electrometry," arXiv:2211.11848v2, [physics.atom-ph] (Nov. 23, 2022). 9 pages.

Sun, et al., "Integrated optical frequency division for microwave and mmWave generation," Nature, https://www.nature.com/articles/s41586-024-07057-0 (Mar. 6, 2024). 7 pages.

* cited by examiner

PHOTONIC WIREBOND LOOPBACK EVANESCENT COUPLER

STATEMENT OF GOVERNMENT INTEREST

This invention was made with United States Government assistance under Grant No. HR001122C0039 awarded by the Defense Advanced Research Projects Agency. The United States Government has certain rights in this invention.

FIELD OF DISCLOSURE

The present disclosure relates to photonic systems and, more particularly, to evanescent coupling mechanisms for use in photonic circuits.

BACKGROUND

High-Q optical microresonators provide a number of useful properties for a wide variety of photonic applications. In particular, bulk crystalline microresonators have several attractive properties and offer advantages over photonic integrated circuit-based microresonators in terms of optical power specifications and ease of manufacture. However, optical coupling to crystalline microresonators remains a significant challenge. For instance, such optical coupling can be accomplished with free-space optical couplers, such as prisms, tapered optical fibers, or angle-cleaved optical fibers, but such optical elements are bulky, fragile, and/or difficult to manufacture. Accordingly, non-trivial issues remain with respect to using crystalline microresonators in photonic systems.

SUMMARY

Aspects and embodiments are directed to techniques for coupling to crystalline microresonators.

According to one embodiment, an evanescent coupler comprises a substrate, first and second optical waveguides formed on the substrate, and a photonic wirebond having first and second end regions coupled to the first and second optical waveguides, respectively, and a loopback portion extending between the first and second end regions, the photonic wirebond extending away from the first optical waveguide by an extension length.

According to another embodiment, a photonic system comprises a photonic integrated circuit, a crystalline microresonator, and a photonic wirebond attached to the photonic integrated circuit and configured to couple light between the photonic integrated circuit and the crystalline microresonator via evanescent coupling.

According to another embodiment, a loopback photonic wirebond comprises a first tapered end region having a circular profile and tapering in diameter from a first diameter at a first end face to a second diameter at a first point a first length away from the first end face, and a second tapered end region having the circular profile and tapering in diameter from the first diameter at a second end face to the second diameter at a second point the first length away from the second end face. In some examples, the loopback photonic wirebond further comprises a loop portion extending from the first point to the second point, the loop portion having an elliptical profile with the second diameter in a first dimension and a third diameter in a second dimension perpendicular to the first dimension, the third diameter being larger than the second diameter, wherein the loop portion is configured to position the second tapered end region parallel to the first tapered end region.

Still other aspects, embodiments, and advantages of these example aspects and embodiments are described in detail below. Embodiments disclosed herein may be combined with other embodiments in any manner consistent with at least one of the principles disclosed herein, and references to “an embodiment,” “some embodiments,” “an alternate embodiment,” “various embodiments,” “one embodiment” or the like are not necessarily mutually exclusive and are intended to indicate that a particular feature, structure, or characteristic described may be included in at least one embodiment. The appearances of such terms herein are not necessarily all referring to the same embodiment.

Figure 1A:
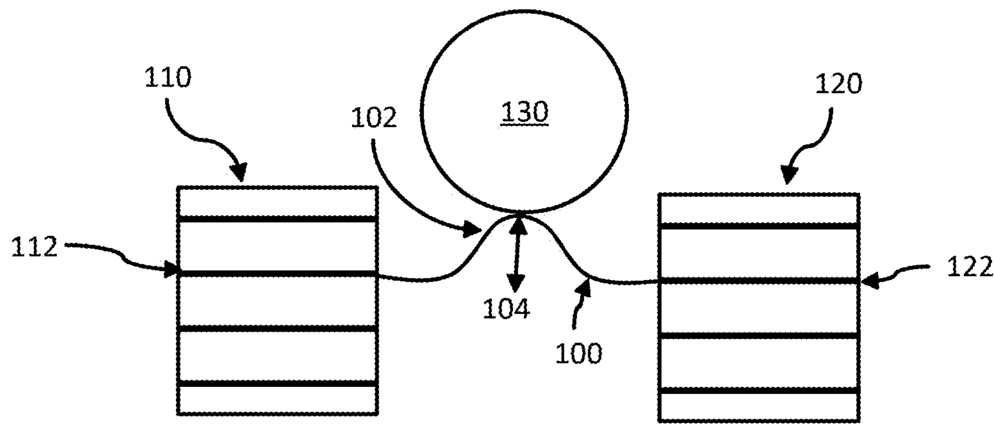
FIG. 1A is a diagram illustrating a plan view (top-down) of an example of a lateral loop photonic wirebond according to aspects of the present disclosure.

Although the following detailed description will proceed with reference being made to illustrative embodiments, many alternatives, modifications, and variations thereof will be apparent in light of this disclosure.

DETAILED DESCRIPTION

Techniques are disclosed herein for coupling optical signals between a crystalline optical microresonator and an optical fiber or photonic integrated circuit (PIC). According to certain examples, an evanescent coupler comprises a substrate, first and second optical waveguides formed on the substrate, and a photonic wirebond having first and second end regions coupled to the first and second optical waveguides, respectively. The photonic wirebond may comprise a loopback portion that extends between the first and second end regions. The photonic wirebond may extend away from the first optical waveguide by an extension length. In some examples, the first and second end regions are tapered regions of an optical waveguide for that forms the photonic wirebond, and the loopback portion is an elliptical region of the optical waveguide. The photonic wirebond can be positioned with the loop portion proximate to or in contact with a crystalline microresonator so as to couple light between the at least one optical waveguide and the microresonator via evanescent coupling.

These and other features of photonic wirebond structures and associated methods are described in more detail below.

General Overview

High-Q optical microresonators have properties that provide numerous advantages and opportunities in various fields of modern photonics. Their small size and high optical field density provide an opportunity to generate various nonlinear effects at low input optical power and low power consumption within a scalable and compact form factor. There are two types of microresonators that are used in photonics applications, those that are located on (or integrated with) a PIC (referred to as PIC-based microresonators) and those that are separate from the PIC (e.g., bulk crystalline microresonators). Crystalline optical microresonators offer several advantages over PIC-based optical microresonators. For example, crystalline optical microresonators can be mass-manufactured from a variety of materials and can support ultra-high quality factors (e.g., $Q \approx 1$ billion) within the ultraviolet to mid-infrared wavelength range. In addition, the larger effective mode area (volume) of crystalline microresonators, as compared to their PIC-based equivalents, leads to lower thermorefractive noise (TRN), which can be a limiting factor in laser frequency stabilization. However, despite these advantages over PIC-based microresonators, optical coupling to crystalline optical microresonators is challenging and presents a significant barrier to the use of crystalline optical microresonators in many applications. In more detail, a mechanism is needed to couple light from the PIC into the three-dimensional structure of the optical microresonator that is located off the PIC, and then from the microresonator back into the PIC. As described above, some examples of coupling approaches include tapered optical fibers, prisms, angle-cleaved fibers, and grating-based fiber couplers. These approaches, however, are bulky, fragile, sensitive to vibration, and/or involve the use of free-space optical elements. As a result, they are not well-suited for high-volume production. Another possible approach might be use of a free-hanging silica waveguide on a silicon chip to couple to a crystalline microresonator lying on its side. However, such an approach involves relatively complex design, fabrication and alignment procedures, and high losses. The PIC itself can be used to inject light into a crystalline microresonator. However, this coupling approach, while compact, is not suitable for certain crystalline materials, such as low refractive index magnesium fluoride (MgF2) bulk material ($n \approx 1.37$ at 1550 nanometers (nm)), which is a preferred material for some photonic applications. Accordingly, non-trivial issues remain with respect to coupling to crystalline optical microresonators.

Thus, described herein are techniques for providing a compact, manufacturable, and robust evanescent coupling solution. An example provides a loopback photonic wirebond evanescent coupler. A photonic wirebond of the coupler may be configured with a geometry that allows the photonic wirebond to be used to couple light between a PIC and a crystalline optical microresonator. According to some such examples, the photonic wirebond is formed with a loop structure having a geometry (e.g., profile, length, loop dimensions) that is suitable for evanescent coupling with an off-PIC crystalline microresonator.

For example, according to certain embodiments, there is provided an evanescent coupler comprising a substrate, first and second optical waveguides formed on the substrate, and a photonic wirebond having first and second end regions coupled to the first and second optical waveguides, respectively, and a loopback portion extending between the first and second end regions, the photonic wirebond extending away from the first optical waveguide by an extension length. In some such examples, the substrate may be a PIC, and the first and second optical waveguides may include optical fibers. As used herein, a waveguide that is said to be on a substrate is intended to include cases where the waveguide is on a surface of the substrate, or within the substrate, or otherwise a part of, or formed within or on, the substrate.

According to further embodiments, there is provided a photonic system comprising a photonic integrated circuit, a crystalline microresonator, and a photonic wirebond attached to the photonic integrated circuit and configured to couple light between the photonic integrated circuit and the crystalline microresonator via evanescent coupling. In some such examples, the photonic wirebond is formed as a loopback photonic wirebond comprising a first tapered end region having a circular profile and tapering in diameter from a first diameter at a first end face to a second diameter at a first point a first length away from the first end face, a second tapered end region having the circular profile and tapering in diameter from the first diameter at a second end face to the second diameter at a second point the first length away from the second end face, and a loop portion extending from the first point to the second point. The loop portion may have an elliptical profile with the second diameter in a first dimension and a third diameter in a second dimension perpendicular to the first dimension, the third diameter being larger than the second diameter. The loop portion can be configured to position the second tapered end region parallel to the first tapered end region. The first and second end faces can be written to connection facets of respective first and second optical waveguides so as to couple the photonic wirebond to the optical waveguides. The substrate and the photonic wirebond can be positioned with respect to a microresonator such that the loop portion of the photonic wirebond is proximate or in contact with the microresonator to thereby couple light into and out of the microresonator via evanescent coupling.

Example Device Architecture

As described above, according to certain examples, photonic wirebonds can be used as evanescent couplers to couple light (e.g., from a laser or other optical source) between an optical fiber array or an optical waveguide on a substrate, such as a PIC, and an off-PIC crystalline optical microresonator. Evanescent coupling is a process by which electromagnetic waves are transmitted from one medium to another via the evanescent, exponentially decaying electromagnetic field. Coupling may be usually accomplished by placing two or more electromagnetic elements, such as optical waveguides, close together so that the evanescent field generated by one element does not decay much before it reaches the other element. For example, evanescent coupling can be achieved though Frustrated Total Internal Reflection (FTIR) in which an evanescent field very close to the surface of a dense medium at which a wave normally undergoes total internal reflection overlaps another dense medium that is close by. This overlap of the evanescent field disrupts the totality of the reflection, diverting some power into the second medium. As described in more detail below, the photonic wirebonds can be formed with various different loop structures to provide an evanescent coupling mechanism to couple light (optical power) between an optical waveguide and a crystalline microresonator.

Figure 1B:
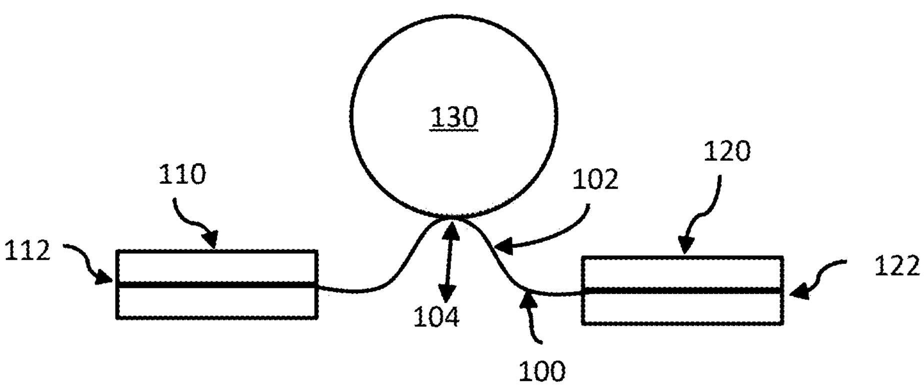
FIG. 1B is a diagram illustrating a plan view (top-down) of an example of a vertical loop photonic wirebond according to aspects of the present disclosure.

FIGS. 1A and 1B are diagrams illustrating plan (top-down) views of photonic wirebond couplers between two fiber arrays according to certain examples. In the illustrated examples, a photonic wirebond 100 is coupled between a first optical fiber 112 of a first fiber array 110 and a second optical fiber 122 of a second fiber array 120. The photonic wirebonds 100 include a loop portion 102 that extends towards and optionally contacts a portion of a crystalline optical microresonator 130. In the example of FIG. 1A, the loop portion 102 of the photonic wirebond 100 extends in the plane of the optical fibers 112, 122. Accordingly, in this example, the photonic wirebond 100 may be referred to as having a lateral loop structure. In the example of FIG. 1B, the loop portion 102 of the photonic wirebond 100 extends in a plane perpendicular to the plane of the optical fibers 112, 122. Thus, in FIG. 1B, the fiber arrays 110, 120 are shown in an "edge-on" view. In this example, the photonic wirebond 100 may be referred to as having a vertical loop structure. In some examples, the photonic wirebonds 100 are configured such that the loop portion 102 either contacts the microresonator 130 or is positioned with a certain gap between the tip of the loop portion 102 and a selected region of the microresonator 130. For example, the loop portion 102 may have an extension length 104 selected to ensure contact with (or a selected gap to) the microresonator 130, depending on the arrangement or physical placement of the microresonator 130 relative to the fiber arrays 110, 120.

The photonic wirebond 100 operates to couple light from the optical fibers 112 and/or 122 into the microresonator 130, and from the microresonator 130 back into the optical fibers 112 and/or 122, via evanescent coupling. Coupling to the microresonator 130 involves refractive index matching between the injected and circulating modes (k-vector matching), and benefits from a large evanescent field extent so as to facilitate light-material interaction. Both of these properties exhibit sensitivity to the geometry of the photonic wirebond 100. The configurations of the photonic wirebonds 100 shown in FIGS. 1A and 1B may be useful for applications in which, in addition to coupling optical signals into and out of the microresonator 130, it is also desirable to transfer the optical signals from one fiber array to another, or from one PIC to another. However, these configurations also involve precise alignment between the two fiber arrays 110, 120, and between both fiber arrays 110, 120 and the microresonator 130, to control the shape of the loop portion 102, which can affect the coupling.

Figure 1C:
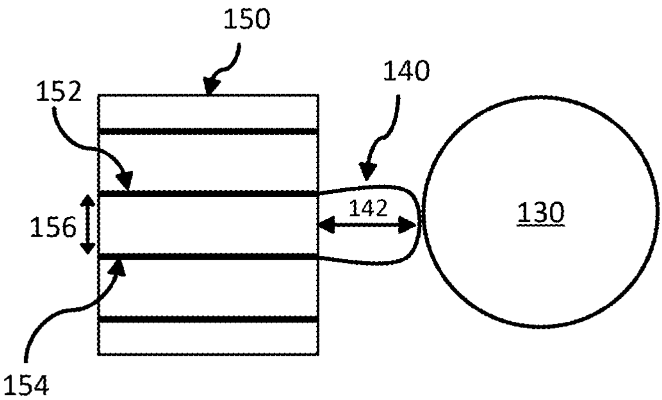
FIG. 1C is a diagram illustrating a plan view (top-down) of an example of a loopback photonic wirebond according to aspects of the present disclosure.

FIG. 1C illustrates another example in which a photonic wirebond 140 has a "loopback" structure. In this example, the photonic wirebond 140 is coupled between first and second optical fibers 152, 154 of a fiber array 150. Thus, in this configuration, the photonic wirebond 140 forms a loop that extends in the plane of the fiber array 150 towards, and optionally to contact, the microresonator 130. As in the case of the photonic wirebond 100, the photonic wirebond 140 operates to couple light from the optical fibers 152 and/or 154 into the microresonator 130, and from the microresonator 130 back into the optical fibers 152 and/or 154, via evanescent coupling. The loopback configuration of the photonic wirebond 140 may provide a more compact and robust coupling mechanism than the configurations of the photonic wirebonds 100 shown in FIGS. 1A and 1B. For example, the loopback configuration avoids the need to align two different fibers arrays 110, 120 (or two different PICS). Furthermore, the loopback configuration may provide more robust and/or simpler control of the loop geometry to achieve desired coupling performance. As shown in FIG. 1C, the first and second optical fibers 152, 154 have a center-to-center spacing, or "pitch" 156. The pitch 156 may be precisely controlled during fabrication of the fiber array 150. In some examples, the pitch 156 may influence one or more dimensional characteristics of the photonic wirebond 140, as described further below, and may be selected to achieve a certain geometry of the wirebond loop.

Figure 2:
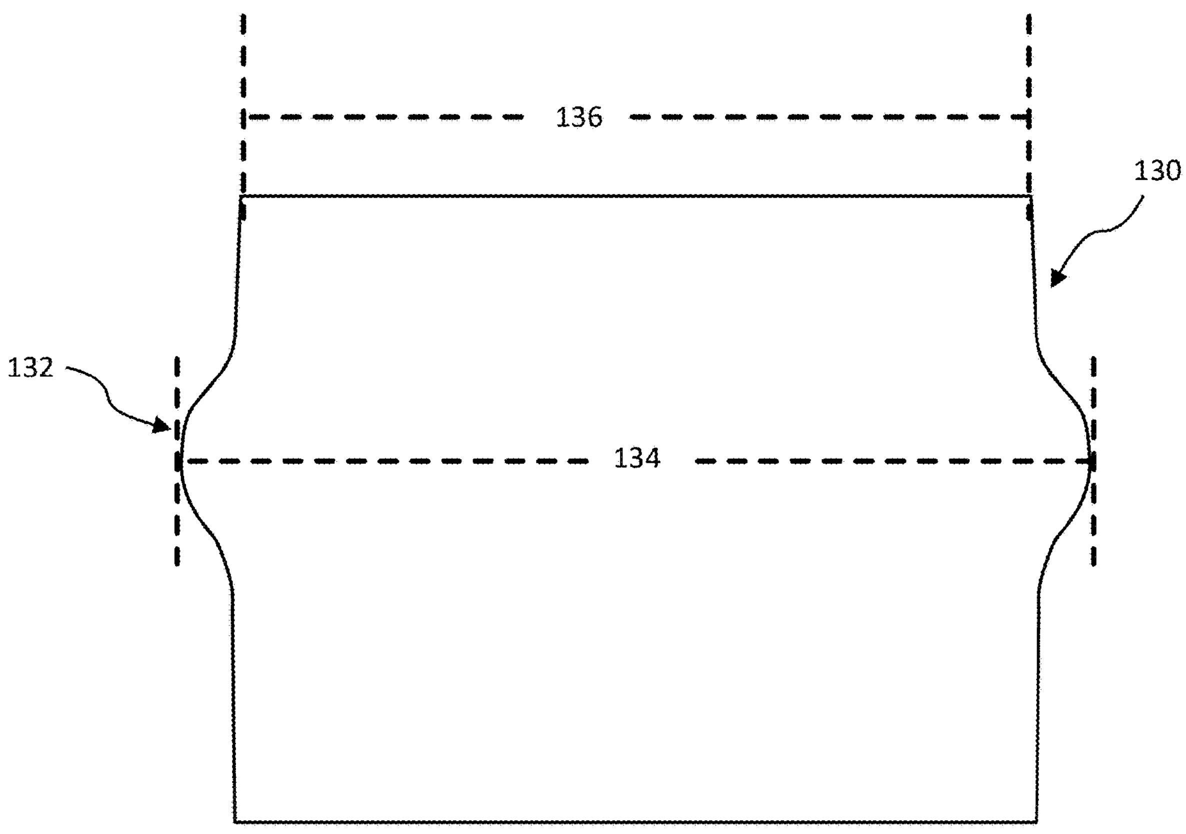
FIG. 2 is a diagram illustrating an example of a crystalline optical microresonator according to aspects of the present disclosure.

FIG. 2 is a diagram illustrating a crystalline optical microresonator 130 according to an example. In this example, the microresonator 130 includes a protrusion 132 having a first diameter 134 that is larger than a second diameter 136 of the remainder of the body of the microresonator 130. In some examples, the microresonator 130 is circular in cross-section (e.g., generally having a cylindrical shape), and the protrusion 132 is an annular protrusion that extends around a circumference of the microresonator 130. The second diameter 136 may be in a range of approximately 1 mm-5 mm. In one example, the second diameter 136 is about 1.3 mm and the first diameter 134 is about 1.5 mm. The microresonator 130 may be made of any of a variety of bulk crystalline materials suitable for photonics applications, including but not limited to, magnesium fluoride ($MgF_2$), for example.

Referring again to FIG. 1C, in some examples, an extension length 142 of the loopback photonic wirebond 140 is selected such that the photonic wirebond 140 contacts the protrusion 132 of the microresonator 130. In other examples, the extension length 142 of the loopback photonic wirebond 140 can be selected such that the tip of the loop is spaced a certain gap distance from the protrusion 132. The extension length 142 may be measured from an end of the photonic wirebond 140 (e.g., where the photonic wirebond 140 couples to one of the optical fibers 152, 154) to a tip of the loop of the photonic wirebond 140. In some examples, the extension length 142 describes the distance by which the photonic wirebond 140 extends away from the fiber array 150.

Figure 3:
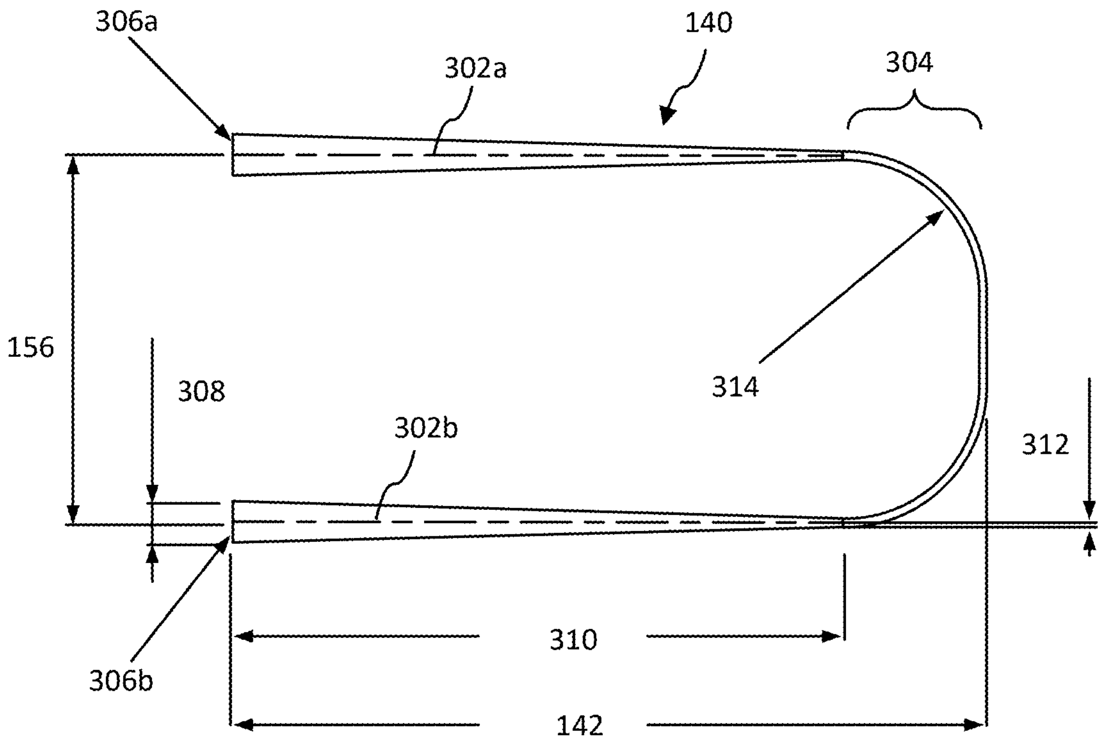
FIG. 3 is diagram of one example of a loopback photonic wirebond according to aspects of the present disclosure.

Referring now to FIG. 3, there is illustrated a diagram showing a structure and dimensions of the loopback photonic wirebond 140 according to some examples. In this example, the photonic wirebond 140 includes two end regions 302*a*, 302*b*, and a U-shaped loopback portion 304 extending between the two end regions 302*a*, 302*b*. The end regions 302*a*, 302*b* have fixed face anchor points 306*a*, 306*b*, respectively, that provide a waveguide interface and can be used to anchor the photonic wirebond 140 to optical waveguides, such as the optical fibers 152, 154 of the fiber array 150, for example. In some examples, the end regions 302*a*, 302*b* include tapered portions (e.g., tapered portions or regions of an optical waveguide forming the photonic wirebond). The tapered portions may have a circular profile (or cross-section). In one example, a first diameter 308 of the tapered portions at the fixed face anchor points 306*a*, 306*b*, may be approximately 15 μm (e.g., 15 μm±<10%). The end regions 302*a*, 302*b*, may taper in diameter over the length 310 of the individual end regions to a second diameter 312 at a junction with the loopback portion 304. In one example, the second diameter 312 may be approximately 2 μm (e.g., 2 μm±<10%). According to certain examples in which the photonic wirebond 140 is to be used for coupling with a crystalline microresonator 130 made of MgF2, these particular values for the diameters 308, 312 are selected because the effective index (neff) for the fundamental TE mode can be engineered through the photonic wirebond geometry to match that of MgF2. In other examples or for other applications, different diameter values may be selected. In some examples, the length 310 of the end regions 302*a*, 302*b* may be at least 40 μm to ensure efficient coupling. For example, the length 310 of the end regions 302*a*, 302*b* may be in a range of about 40 μm to 250 μm, or 100 μm to 250 μm, or in some examples, approximately 210 μm (e.g., 210 μm±<10%).

Figure 4:
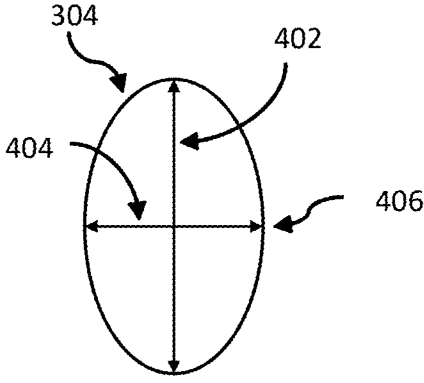
FIG. 4 is a diagram showing a portion of the loopback photonic wirebond of FIG. 3 having an elliptical profile according to aspects of the present disclosure.

In some examples, the loopback portion 304 includes an elliptical coupler, such that at least a portion of the loopback portion 304 has an elliptical cross-section, as shown in FIG. 4, for example. An elliptical optical waveguide forming the loopback portion 304 may have a major diameter 402 that is approximately double the dimension of the minor diameter 404. In some examples, the minor diameter 404 is selected to substantially match the second diameter 312 (e.g., to be the same as the second diameter within a small or otherwise acceptable margin of error, such as <1%, for example). In one example, the minor diameter 404 is approximately 2 μm (e.g., 2 μm±<10%) and the major diameter 402 is approximately 4 μm (e.g., 4 μm±<10%). The elliptical optical waveguide of the loopback portion 304 may be oriented such that the major diameter is substantially parallel to the surface of the microresonator 130, such that the loopback portion 304 has a contact region 406 that contacts the microresonator 130. The use of an elliptical coupler may be advantageous in that it allows for tuning in two dimensions which may allow individual tuning of different characteristics or parameters of the coupler. For example, the coupling efficiency can be tuned by tuning the minor diameter 404 to keep the optical waveguide of the loopback portion 304 relatively narrow in one dimension, which allows more light to be coupled into the microresonator 130 via a greater extent of the evanescent field (higher coupling efficiency). Tuning the major diameter 402 allows the optical waveguide to made longer in the other dimension, thereby increasing the surface area of the optical waveguide, which allows the photonic wirebond 140 to support higher optical power.

Referring again to FIG. 3, the end regions 302*a*, 302*b* and the loopback portion 304 may be regions of a single optical waveguide (such as an optical fiber or other optical waveguide structure/material) that is constructed with different geometric properties (e.g., diameter, taper, profile,) in the different regions. The loopback portion 304 has a radius of curvature 314. In some examples, the radius of curvature 314 is in a range of about 40 μm to 55 μm, or 45 μm to 50 μm, or in some examples, approximately 48.5 μm (e.g., 48.5 μm±<10%). As described above, the pitch 156 is the center-to-center spacing between the optical waveguides to which the photonic wirebond 140 is to be coupled, and therefore corresponds to the center-to-center spacing between the end regions 302*a*, 302*b*, as shown in FIG. 3. In some examples, the pitch 156 is in a range of about 100 μm to 250 μm, or in some examples, approximately 127 μm (e.g., 127 μm±<10%). In some examples, the extension length 142 of the photonic wirebond 140 is in a range of about 100 μm to 300 μm. Thus, the various aspects of the geometry of the loopback photonic wirebond 140 may be selected and tuned so as to provide a coupling mechanism that is capable of handling high optical power, while also being robust and repeatably manufacturable with good reliability. It will be appreciated, however, that photonic wirebonds as described herein may have different dimensions depending on a variety of factors, including the application for which the coupling mechanism is being designed, and the dimensions provided herein are illustrative examples only and not intended to be limiting.

According to certain examples, the photonic wirebond 140 (or the photonic wirebonds 100) can be manufactured using additive three-dimensional (3D) printing techniques. The use of 3D printing allows the photonic wirebonds 100, 140 to be manufactured with precisely controllable, yet widely variable, dimensions and geometry that can be tailored to specific applications. In other examples, the photonic wirebonds 100, 140 can be formed using laser-based etching techniques. Other manufacturing techniques may also be used. In some examples, the photonic wirebonds 100, 140 can be made of a photoresist material, such as SU-8 (a negative-tone photoresist material), for example. The selection of SU-8 may be advantageous in some applications because its refractive index is a good match to the refractive index of MgF2, which may be often used for the microresonator 130. These photonic wirebonds may be written onto the facets of fiber arrays 110, 120, 150, or PICs using a two-photon polymerization process.

Figure 5:
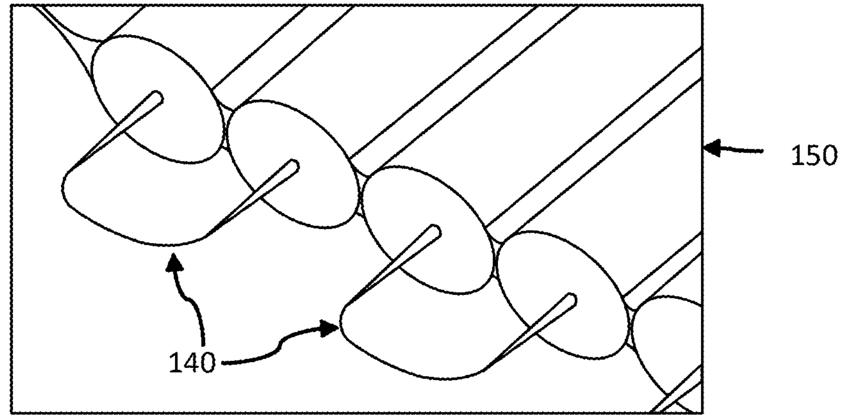
FIG. 5 is a diagram illustrating a portion of a fiber array having a plurality of loopback photonic wirebonds attached thereto according to aspects of the present disclosure.

FIG. 5 illustrates an example of loopback photonic wirebonds 140, such as described above with reference to FIGS. 3 and 4, written to the fiber array 150. In this example, the fiber array 150 is a V-groove multi-channel array comprising a plurality of optical fibers. As described above, the fixed face anchor points 306*a*, 306*b* (FIG. 3) provide interfaces (or input/output ports) between the photonic wirebonds 140 and the respective optical fibers of the fiber array 150. In some examples, the total losses from photonic wirebond to fiber array facet junctions do not exceed 0.85 dB/facet (at a light wavelength of 1550 nm) and support power handling of more than 400 mW.

Figure 6:
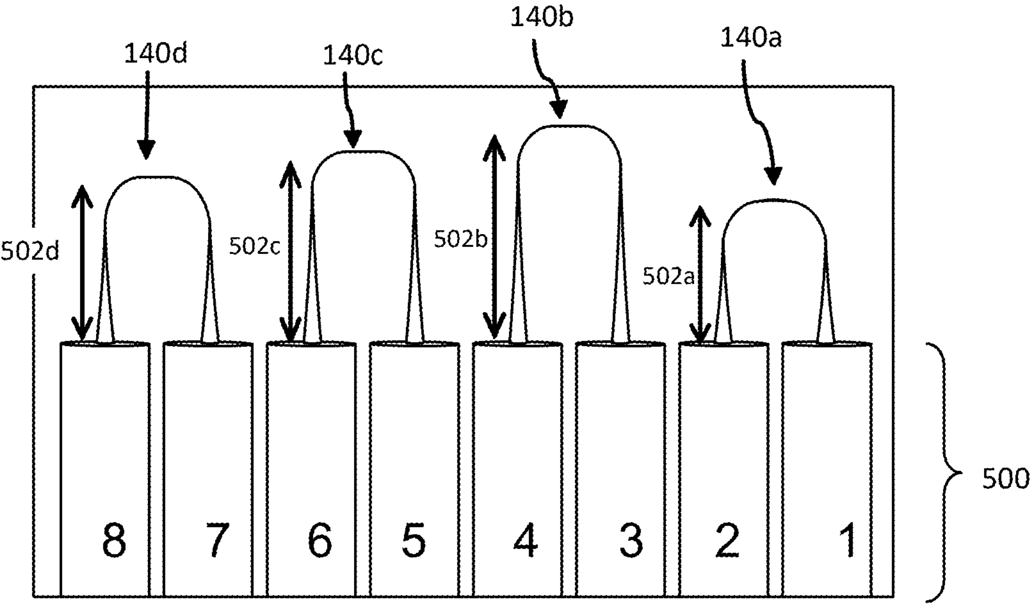
FIG. 6 is a plan view (top-down) of a portion of a fiber array having a plurality of loopback photonic wirebonds attached thereto according to aspects of the present disclosure.

FIG. 6 illustrates a portion of a fiber array 500 and a plurality of loopback wirebonds 140 (individually identified as photonic wirebonds 140*a-d*). In this example, the fiber array 500 includes 8 channels, or eight optical fibers, individually numbered 1-8. FIG. 6 illustrates four photonic wirebonds 140*a-d*, each coupled to a respected pair of the optical fibers, and each with a different extension length 502*a-d*, respectively. In this example, the first photonic wirebond 140*a* has an extension length 502*a* of 100 μm, the second photonic wirebond 140*b* has an extension length 502*b* of 190 μm, the third photonic wirebond 140*c* has an extension length 502*c* of 150 μm, and the fourth photonic wirebond 140*d* has an extension length 502*d* of 120 μm. In this example, the pitch between the individual optical fibers 1-8 of the fiber array 500 is 127 μm. FIG. 6 illustrates that the loopback photonic wirebonds 140 can be manufactured with different extension lengths and a consistent, well-formed loop shape.

Testing of the variation in output power from photonic wirebonds 140 having the construction shown in FIG. 3 over varying ambient temperatures ranging from −40° C. to +85° C. and subject to various mechanical stresses revealed an impressively low 0.3 dB peak-to-peak variation, indicating that the loopback photonic wirebonds 140 can reliably support high optical powers over vastly different operating environments. Thus, examples of the photonic wirebond 140 may provide a robust coupling mechanism for crystalline microresonators suitable for a wide range of photonic applications.

In the examples of FIGS. 1C, 5, and 6, the loopback photonic wirebond 140 is shown coupled to optical fibers of a fiber array. As described above, in some examples, the photonic wirebond 140 (or the photonic wirebond 100) can be used to couple light between the crystalline microresonator 130 and an optical waveguide formed on a substrate. For example, the photonic wirebonds 100, 140 can be used to couple light between a PIC and the crystalline microresonator 130. Examples of a coupling arrangement between a PIC and the microresonator 130 using the photonic wirebond 140 are illustrated in FIGS. 7A and 7B.

Figure 7A:
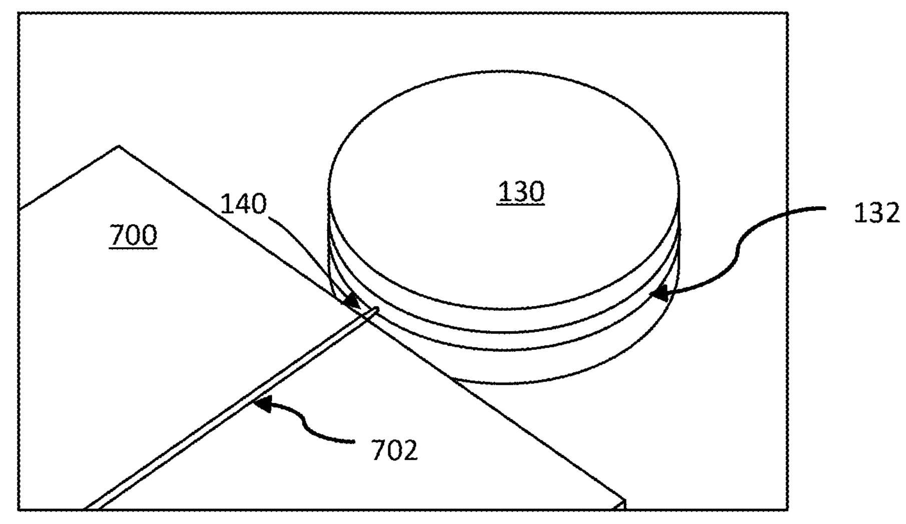
FIG. 7A is a diagram illustrating a perspective view of an example of a photonic wirebond providing a coupling mechanism between a photonic integrated circuit and a crystalline microresonator according to aspects of the present disclosure.

Referring to FIG. 7A, there is illustrated a perspective view of an example of a photonic system including a PIC 700 and the microresonator 130. An optical waveguide structure 702 is formed on the PIC 700. The optical waveguide structure 702 may include a pair of optical fibers, as described above, or may be formed using other optical waveguide technology. The photonic wirebond 140 is coupled to first and second optical waveguides of the optical waveguide structure 702, as shown and as described above.

Figure 7B:
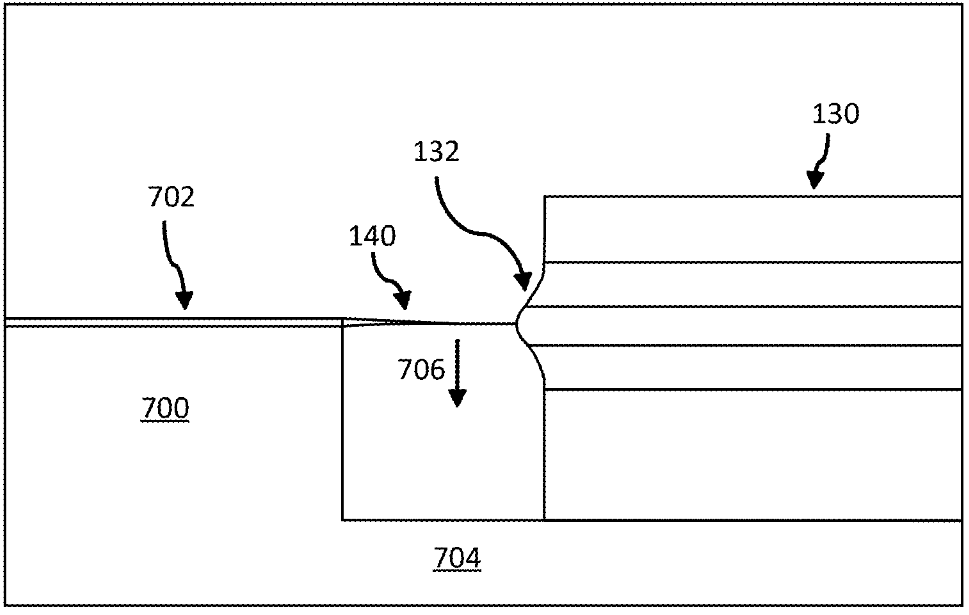
FIG. 7B is a diagram illustrating a side view of an example of a photonic wirebond providing a coupling mechanism between a photonic integrated circuit and a crystalline microresonator according to aspects of the present disclosure.

FIG. 7B is a side view of an example of the photonic system of FIG. 7A. In this example, the photonic wirebond 140 extends from the PIC 700 across a silicon trench 704 to contact (or approach) the protrusion 132 of the microresonator 130. In some examples and orientations of the photonic system, the downward force of gravity on the photonic wirebond 140 as it extends across the trench 704 (indicated by arrow 706) can cause the photonic wirebond to droop downwards, rather than remain in a perfectly level plane. Accordingly, the alignment of the photonic wirebond 140 with the microresonator 130 and/or the extension length of the photonic wirebond 140 may be tailored to account for some droop. For example, the photonic wirebond 140 can be initially aligned slightly above the midpoint (or "equator") of the microresonator 130, such that as gravity-induced droop causes the at least the end of the photonic wirebond 140 to bend downwards, the tip region of the loop contacts and rests against the protrusion 132. This configuration may naturally and advantageously provide some resilience or robustness of the coupling to vibration or other mechanical perturbances.

Figure 8:
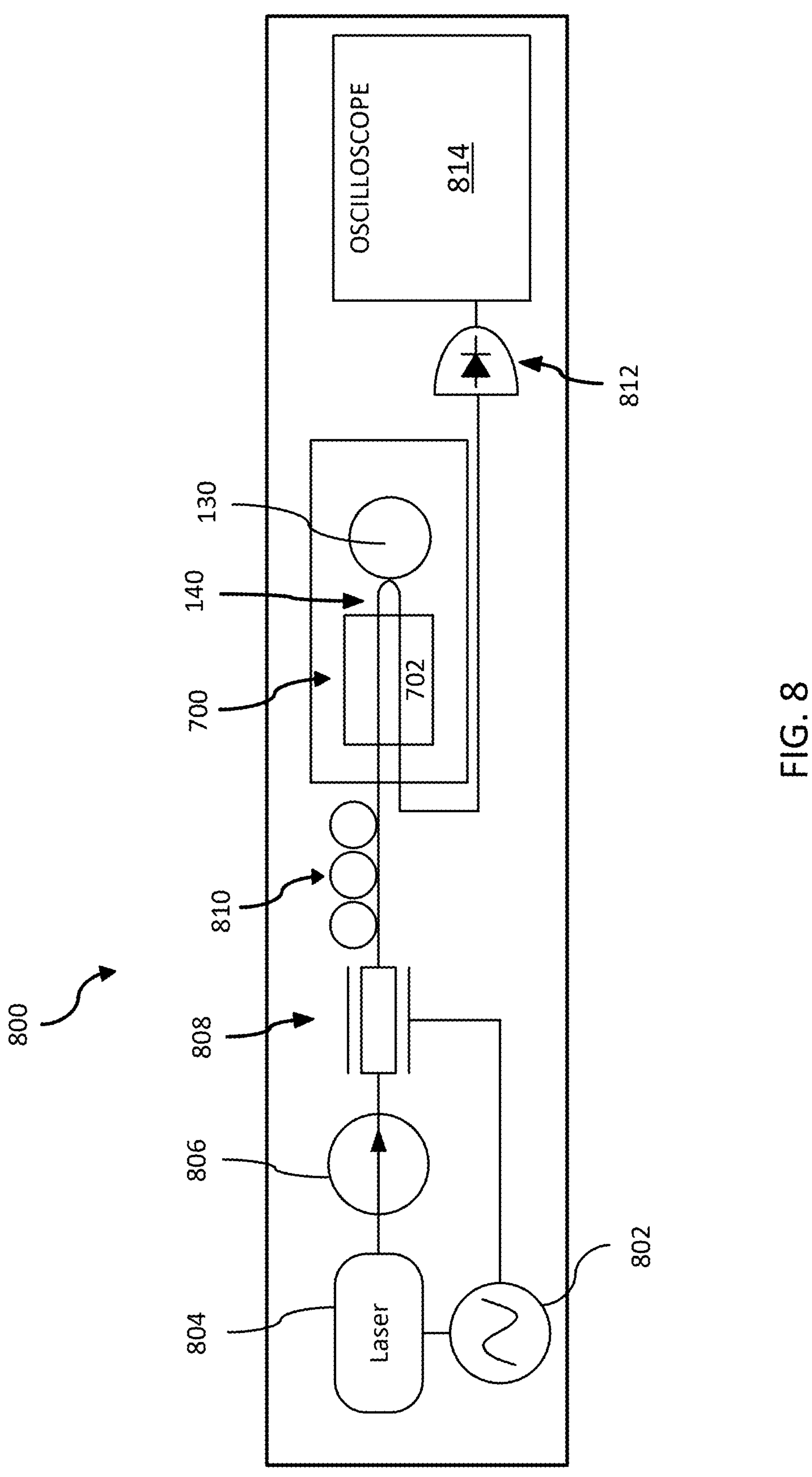
FIG. 8 is a block diagram of a test system for measuring various characteristics of a photonic wirebond according to aspects of the present disclosure.

FIG. 8 is a block diagram of one example of a test system that can be used to test various performance characteristics and parameters, such as coupling ideality and Q-factor, of the photonic wirebond 140 in a linear photonics system having the arrangement shown in FIG. 7A. The test system 800 includes an arbitrary waveform generator 802, a laser 804, an isolator 806, an electro-optical modulator 808, a polarization controller 810, a measurement photodetector 812, and an oscilloscope 814. The laser 804 generates light to be coupled into and out of the microresonator 130 via the photonic wirebond 140 and the optical waveguide structure 702 on the PIC 700. The measurement photodetector 812 is configured to sample the optical signal returned from the microresonator 130 into the optical waveguide structure 702 and to provide a corresponding electrical signal to the oscilloscope 814 that produces test results based on the electrical signal. To characterize the linear operating regime at low input optical power (<10 mW), input light from the laser 804 is frequency-modulated by a 10 Hz triangular waveform to reveal a resonance mode spectrum. The electro-optic modulator 808 can be used to provide a time-frequency calibration on the oscilloscope 814 to allow for evaluation of the full-width half maxima (FWHM) of selected resonances and extraction of the associated quality factors.

Figure 9:
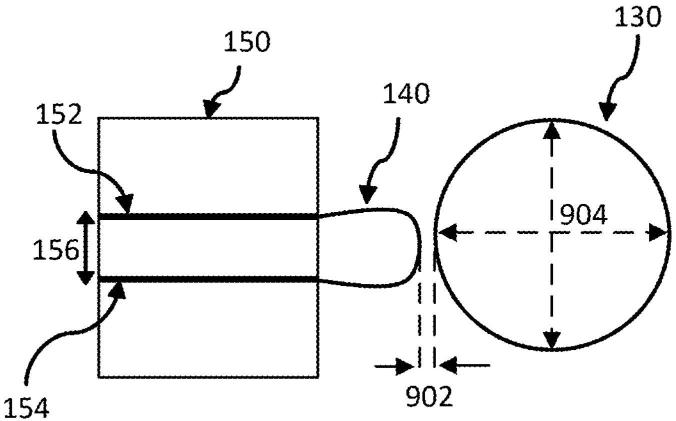
FIG. 9 is a diagram illustrating a plan view (top-down) of an example of a loopback photonic wirebond and a microresonator according to aspects of the present disclosure.

Referring to FIG. 9, there is illustrated a top-down view of an example of the photonic system of FIG. 1C, illustrating certain dimensions. To test the coupling performance of the photonic wirebond 140 as a function of the distance 902 between the end of the photonic wirebond 140 and the microresonator 130 in the plane of the photonic wirebond 140, the photonic wirebond 140 can be aligned with the equator 904 of the protrusion 132 of the microresonator 130 (as shown in FIG. 9). The gap 902 between the protrusion 132 and the tip region of the loop of the photonic wirebond 140 can be varied using a piezoelectric stage, for example, to provide under-coupled, critically coupled, and over-coupled states. In each configuration, the linewidth of a particular resonance can be measured using the oscilloscope 814 and the test system 800 shown in FIG. 8. For the following test results illustrated in FIGS. 10A and 10B, a MgF2 microresonator 130 having a diameter of approximately 5 mm, corresponding to a nominal free spectral range of about 14.2 GHz, was used in the test system 800.

Figure 10A:
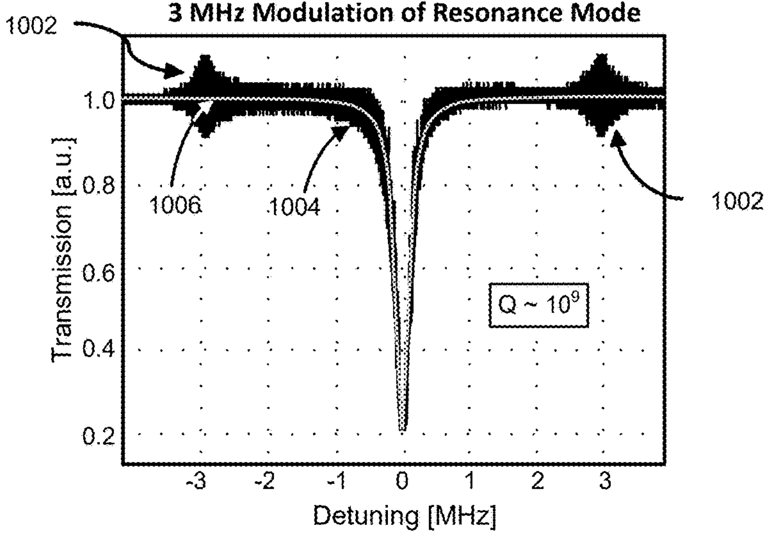
FIG. 10A is a graph illustrating an example of a resonance mode of a coupling device using the photonic wirebond and microresonator of FIG. 7A obtained using the test system of FIG. 8 according to aspects of the present disclosure.

FIG. 10A presents a linewidth measurement of a resonance mode. Using 3 MHz calibration sidebands 1002 from the electro-optical modulator 808 and normalizing the voltage at the output of the photodetector 812, the measured transmitted light 1004 can be fit with a Lorentzian 1006. The FWHM of this Lorentzian 1006 corresponds to the total microresonator linewidth. In the example of FIG. 10A, the extracted linewidth is 240 kHz, corresponding to a loaded Q-factor of about 1 billion at 1550 nm.

Figure 10B:
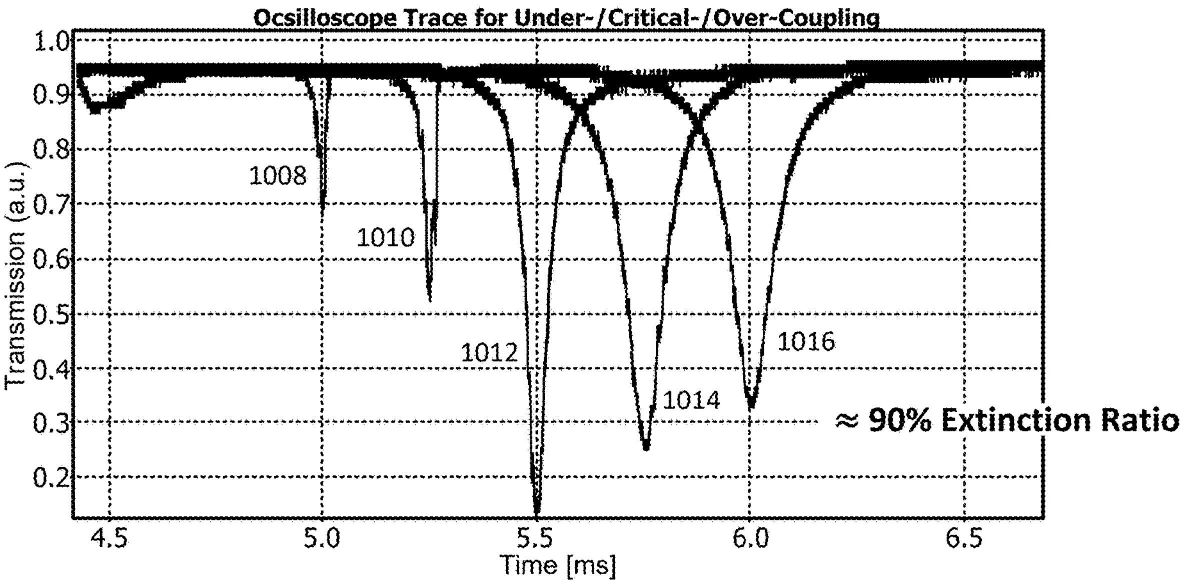
FIG. 10B is a graph illustrating different coupling states as a function of a gap between the photonic wirebond and microresonator of FIG. 7A obtained using the test system of FIG. 8 according to aspects of the present disclosure.

FIG. 10B illustrates the evolution of resonance linewidth as a function of the gap between the microresonator 130 and the photonic wirebond 140 for a single resonance. The transmission is shown in arbitrary units. Trace 1010 corresponds to a gap width of 900 nm, trace 1012 corresponds to a gap width of 600 nm, trace 1014 corresponds to a gap width of 150 nm, trace 1016 corresponds to a gap width of 100 nm, and trace 1018 corresponds to contact, or a gap width of 0 nm. In FIG. 10B, all traces 1010-1018 correspond to the same resonance and have been offset in time to better visualize the transition from under-coupled (traces 1010 and 1012), to critically coupled (trace 1014), to over-coupled (traces 1016 and 1018) states. Furthermore, the total displacement between under-coupled to over-coupled states is 1.5 μm. The measured extinction ratio in the critically couple state is approximately 85-90% in this example.

Thus, aspects and embodiments provide photonic wirebond structures that can be used to achieve evanescent coupling between a PIC or optical fiber array and a discrete crystalline optical microresonator. Test results demonstrate that good coupling efficiency can be achieved, that the loopback photonic wirebond structure provides a robust coupling mechanism over a range of different operating conditions, and that the loopback photonic wirebond can be reliably manufactured using techniques that are compatible with high-volume production.

Further Example Embodiments

The following examples pertain to further embodiments, from which numerous permutations and configurations will be apparent.

Example 1 provides an evanescent coupler comprising a substrate, first and second optical waveguides formed on the substrate, and a photonic wirebond having first and second end regions coupled to the first and second optical waveguides, respectively, and a loopback portion extending between the first and second end regions, the photonic wirebond extending away from the first optical waveguide by an extension length.

Example 2 includes the evanescent coupler of Example 1, wherein the loopback portion is U-shaped.

Example 3 includes the evanescent coupler of one of Examples 1 or 2, wherein the loopback portion has a radius of curvature in a range of 40 μm to 55 μm.

Example 4 includes the evanescent coupler of any one of Examples 1-3, wherein the first optical waveguide includes a first optical fiber coupled to the first end region of the photonic wirebond and the second optical waveguide includes a second optical fiber coupled to the second end region of the photonic wirebond, and wherein a pitch between the first and second optical fibers on the substrate is in a range of 120 μm to 130 μm.

Example 5 includes the evanescent coupler of any one of Examples 1-4, wherein the loopback portion has an elliptical profile.

Example 6 includes the evanescent coupler of Example 5, wherein the first and second end regions each includes a tapered portion having a circular profile, and wherein a diameter of the circular profile substantially matches a minor diameter of the elliptical profile of the loopback portion.

Example 7 includes the evanescent coupler of Example 6, wherein the tapered portion has a length in a range of 40 μm to 250 μm.

Example 8 includes the evanescent coupler of any one of Examples 1-7, wherein the extension length is in a range of 100 μm to 300 μm.

Example 9 includes the evanescent coupler of any one of Examples 1-8, wherein the photonic wirebond is made of a negative-tone photoresist material.

Example 10 provides a photonic system comprising the evanescent coupler of any one of Examples 1-9.

Example 11 provides a photonic system comprising a photonic integrated circuit, a crystalline microresonator, and a loopback photonic wirebond attached to the photonic integrated circuit and configured to couple light between the photonic integrated circuit and the crystalline microresonator via evanescent coupling. The photonic integrated circuit includes a first optical waveguide and a second optical waveguide, and the loopback photonic wirebond is formed as a loop extending from a first facet of the first optical waveguide to a second facet of the second optical waveguide.

Example 12 includes the photonic system of Example 11, wherein the loopback photonic wirebond is made of a negative-tone photoresist material.

Example 13 includes the photonic system of one of Examples 11 or 12, wherein the loopback photonic wirebond includes a first end region attached to the first facet of the first optical waveguide, a second end region attached to the second facet of the second optical waveguide, and a loop portion extending between the first and second end regions, wherein the first and second end regions have a circular profile, and wherein the loop portion has an elliptical profile.

Example 14 includes the photonic system of any one of Examples 11-13, wherein the loopback photonic wirebond has an extension length corresponding to a distance between the photonic integrated circuit and the crystalline microresonator, such that a tip region of the loop portion of the loopback photonic wirebond is (i) in contact with a region of the crystalline microresonator, or (ii) spaced apart from the region of the microresonator by a predetermined gap distance.

Example 15 includes the photonic system of Example 14, wherein the first and second end regions are tapered, having a first diameter at the first and second facets, respectively, and a second diameter at respective junctions with the loop portion, wherein the second diameter is smaller than the first diameter.

Example 16 includes the photonic system of Example 15, wherein the first diameter is 15 μm and the second diameter is 2 μm.

Example 17 includes the photonic system of one of Examples 15 or 16, wherein a length of each of the first and second end regions is in a range of 40 μm to 250 μm.

Example 18 includes the photonic system of any one of Examples 12-17, wherein the first and second optical waveguides are optical fibers.

Example 19 includes the photonic system of any one of Examples 11-18, wherein the crystalline microresonator is made of $MgF_2$ and the photonic wirebond is made of SU-8.

Example 20 provides a loopback photonic wirebond comprising a first tapered end region having a circular profile and tapering in diameter from a first diameter at a first end face to a second diameter at a first point a first length away from the first end face, a second tapered end region having the circular profile and tapering in diameter from the first diameter at a second end face to the second diameter at a second point the first length away from the second end face, and a loop portion extending from the first point to the second point, the loop portion having an elliptical profile with the second diameter in a first dimension and a third diameter in a second dimension perpendicular to the first dimension, the third diameter being larger than the second diameter, wherein the loop portion is configured to position the second tapered end region parallel to the first tapered end region.

Example 21 includes the loopback photonic wirebond of Example 20, wherein the first diameter is 15 μm, the second diameter is 2 μm, the third diameter is 4 μm, and the first length is at least 40 μm.

Example 22 includes the loopback photonic wirebond of one of Examples 20 or 21, wherein the loopback photonic wirebond is made of a negative-tone photoresist material.

Example 23 includes the loopback photonic wirebond of Example 22, wherein the negative-tone photoresist material is SU-8.

Example 24 includes the loopback photonic wirebond of Example 20, wherein the first diameter and the second diameter are selected based on a target effective index for a fundamental TE mode to be propagated by the loopback photonic wirebond.

Example 25 provides a photonic system comprising a photonic integrated circuit, a crystalline microresonator, and a photonic wirebond attached to the photonic integrated circuit and configured to couple light between the photonic integrated circuit and the crystalline microresonator via evanescent coupling.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An evanescent coupler comprising:

a substrate;

a first optical waveguide formed on the substrate;

a second optical waveguide formed on the substrate; and a photonic wirebond having first and second end regions coupled to the first and second optical waveguides, respectively, and a loopback portion extending between the first and second end regions, the photonic wirebond extending away from the first optical waveguide by an extension length, wherein the loopback portion has an elliptical profile that is configured to individually tune different characteristics of the loopback portion and its optical coupling with a microresonator.

2. The evanescent coupler of claim 1, wherein the loopback portion is U-shaped.

3. The evanescent coupler of claim 2, wherein the loopback portion has a radius of curvature in a range of 40 μm to 55 μm.

4. The evanescent coupler of claim 3, wherein the first optical waveguide includes a first optical fiber coupled to the first end region of the photonic wirebond, wherein the second optical waveguide includes a second optical fiber coupled to the second end region of the photonic wirebond, and wherein a pitch between the first and second optical fibers on the substrate is in a range of 120 μm to 130 μm.

5. The evanescent coupler of claim 1, wherein the first and second end regions each includes a tapered portion having a circular profile, and wherein a diameter of the circular profile substantially matches a minor diameter of the elliptical profile of the loopback portion.

6. The evanescent coupler of claim 5, wherein the tapered portion has a length in a range of 40 μm to 250 μm.

7. The evanescent coupler of claim 1, wherein the extension length is in a range of 100 μm to 300 μm.

8. The evanescent coupler of claim 1, wherein the photonic wirebond is made of a negative-tone photoresist material.

9. A photonic system comprising the evanescent coupler of claim 1.

10. A photonic system comprising:

a photonic integrated circuit including a first optical waveguide and a second optical waveguide;

a crystalline microresonator; and a loopback photonic wirebond attached to the photonic integrated circuit and configured to couple light between the photonic integrated circuit and the crystalline microresonator via evanescent coupling; wherein the loopback photonic wirebond is formed as a loop extending from a first facet of the first optical waveguide to a second facet of the second optical waveguide, wherein the loopback photonic wirebond includes a first end region attached to the first facet of the first optical waveguide, a second end region attached to the second facet of the second optical waveguide, and a loop portion extending between the first and second end regions; the first and second end regions have a circular profile; and the loop portion has an elliptical profile that is configured to individually tune different characteristics of the loopback portion and its optical coupling with the crystalline microresonator.

11. The photonic system of claim 10, wherein the loopback photonic wirebond has an extension length corresponding to a distance between the photonic integrated circuit and the crystalline microresonator, such that a tip region of the loopback photonic wirebond is (i) in contact with a region of the crystalline microresonator, or (ii) spaced apart from the region of the microresonator by a predetermined gap distance.

12. The photonic system of claim 10, wherein the first and second end regions are tapered, having a first diameter at the first and second facets, respectively, and a second diameter at respective junctions with the loop portion, wherein the second diameter is smaller than the first diameter.

13. The photonic system of claim 12, wherein the first diameter is 15 μm and the second diameter is 2 μm.

14. The photonic system of claim 12, wherein a length of each of the first and second end regions is in a range of 40 μm to 250 μm.

15. The photonic system of claim 10, wherein the first and second optical waveguides are optical fibers.

16. The photonic system of claim 10, wherein the crystalline microresonator is made of $MgF2$ and the photonic wirebond is made of SU-8.

17. A loopback photonic wirebond comprising:

a first tapered end region having a circular profile and tapering in diameter from a first diameter at a first end face to a second diameter at a first point a first length away from the first end face;

a second tapered end region having the circular profile and tapering in diameter from the first diameter at a second end face to the second diameter at a second point the first length away from the second end face; and a loop portion extending from the first point to the second point, the loop portion having an elliptical profile with the second diameter in a first dimension and a third diameter in a second dimension perpendicular to the first dimension, the third diameter being larger than the second diameter, wherein the loop portion is configured to position the second tapered end region parallel to the first tapered end region, wherein a diameter of the circular profile substantially matches a minor diameter of the elliptical profile of the loop portion.

18. The loopback photonic wirebond of claim 17, wherein:

the first diameter is approximately 15 μm;

the second diameter is approximately 2 μm;

the third diameter is approximately 4 μm; and the first length is at least 40 μm.

* * * * *